US009645301B2

(12) United States Patent
Sahlhoff (10) Patent No.: US 9,645,301 B2
(45) Date of Patent: May 9, 2017

(54) LIGHTING ASSEMBLY WITH EDGE-LIT LIGHT GUIDE AND STRUCTURED COVER

(71) Applicant: Rambus Delaware LLC, Brecksville, OH (US)

(72) Inventor: Dane A. Sahlhoff, Strongsville, OH (US)

(73) Assignee: Rambus Delaware LLC, Brecksville, OH (US)

( * ) Notice: Subject to any disclaimer, the term of this patent is extended or adjusted under 35 U.S.C. 154(b) by 62 days.

(21) Appl. No.: 14/535,890

(22) Filed: Nov. 7, 2014

(65) Prior Publication Data

US 2015/0277018 A1 Oct. 1, 2015

Related U.S. Application Data

(60) Provisional application No. 61/971,738, filed on Mar. 28, 2014.

(51) Int. Cl.

| F21V 7/04 | (2006.01) |
|---|---|
| F21V 8/00 | (2006.01) |
| G02F 1/1335 | (2006.01) |
| F21V 5/02 | (2006.01) |

(52) U.S. Cl.
CPC ........... *G02B 6/005* (2013.01); *G02B 6/0036* (2013.01); *G02B 6/0053* (2013.01); *G02B 6/0073* (2013.01); *F21V 5/02* (2013.01); *G02B 6/0038* (2013.01); *G02F 2001/133607* (2013.01)

(58) Field of Classification Search
CPC .. G02B 6/0033; G02B 6/0035; G02B 6/0036; G02B 6/0038; G02B 6/004; G02B 6/0043; G02B 6/005; G02B 6/0053; G02B 6/0073; G02F 2001/133607; F21V 5/02

See application file for complete search history.

(56) References Cited

U.S. PATENT DOCUMENTS

| 5,467,417 A | 11/1995 | Nakamura et al. |
| 6,752,505 B2 | 6/2004 | Parker et al. |
| 2005/0122591 A1* | 6/2005 | Parker ...................... F21V 5/00 359/619 |
| 2007/0086086 A1 | 4/2007 | Cassarly et al. |

(Continued)

OTHER PUBLICATIONS

Extended European Search Report for corresponding Application No. 14198848 dated Aug. 7, 2015.

*Primary Examiner* — Y M Lee
(74) *Attorney, Agent, or Firm* — Renner, Otto, Boisselle & Sklar, LLP (57) ABSTRACT

A cover element for use in a lighting assembly that includes an edge-lit light guide. The cover element includes a first major surface through which light output by the light guide enters the cover element, the light including light propagating at high angles relative to normal to the first major surface of the cover element. The cover element also includes a second major surface opposed to the first major surface and having optical elements that each have plural surfaces arranged relative one another so that the optical element redirects high angle light incident on any one of the surfaces of the optical element and travelling in a direction with any vector component orthogonal to the normal to have a reduced angle in the normal direction as the light exits the cover element through the optical element.

20 Claims, 6 Drawing Sheets

(56) References Cited

U.S. PATENT DOCUMENTS

2011/0128757 A1\* 6/2011 Wang .................. G02B 6/0035
  362/613
2013/0033900 A1 2/2013 McCollum et al.
2013/0308337 A1 11/2013 Chang et al.

\* cited by examiner

LIGHTING ASSEMBLY WITH EDGE-LIT LIGHT GUIDE AND STRUCTURED COVER

BACKGROUND

Light emitting diodes (LEDs) show promise as an energy efficient light source for lighting assemblies. For some LED-based lighting assemblies, the light emitted from the light source is input to a light guide and light extracting elements cause the light to exit the light guide. In many lighting applications, however, light that is emitted at high angles (e.g., greater than 45° from normal to the light guide) can cause distraction or even discomfort to people near the lighting assembly. As a result, a lighting product with low glare is considered more desirable than a lighting product with high glare. In edge lit systems, especially those using diffuse back reflectors, a high degree of ray angle control is achievable. Although control over ray angle may reduce glare, there is often some light that is uncontrolled and emitted at angles sufficient to cause glare. The resulting intensity distribution with the glare component is not always desirable.

DESCRIPTION

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

In this disclosure, angles of incidence, reflection, and refraction, as well as output angles, are measured relative to the normal to the surface with which the light interacts.

In accordance with one aspect of the present disclosure, a lighting assembly includes a light guide, a light source, and a cover element. The light guide includes: a first major surface and a second major surface opposed to the first major surface, the opposed major surfaces spaced apart in a thickness direction of the light guide and wherein light propagates by total internal reflection between the opposed major surfaces, the opposed major surfaces having a length in a length direction and a width in a width direction, the length, width and thickness directions being mutually orthogonal to each other and each major surface extending in a respective length-width plane; a light input edge that extends in the thickness direction between the opposed major surfaces and having a surface area through which the light is received into the light guide; and light extracting elements at at least one of the major surfaces of the light guide, the light extracting elements disrupt the total internal reflection of the propagating light in the light guide to output the light from the light guide via at least the first major surface of the light guide. The light source is positioned relative to the light input edge to input light into the light guide via the light input edge, some of the light from the light source disrupted by the light extracting elements and output from the light guide being at a high angle relative to the first major surface of the light guide. The cover element includes a first major surface and a second major surface opposed to the first major surface, the first major surface of the cover element juxtaposed with the first major surface of the light guide and the light output from the light guide via the first major surface of the light guide entering the cover element via the first major surface of the cover element and propagating toward the second major surface of the cover element. The second major surface of the cover element includes optical elements, the optical elements each comprise plural surfaces (e.g., three or more) arranged relative one another so that the optical element redirects high angle light incident on any one of the surfaces of the optical element and travelling in a direction with any length-width vector component to have a reduced angle in the thickness direction as the light exits the cover element through the optical element.

Figure 1:
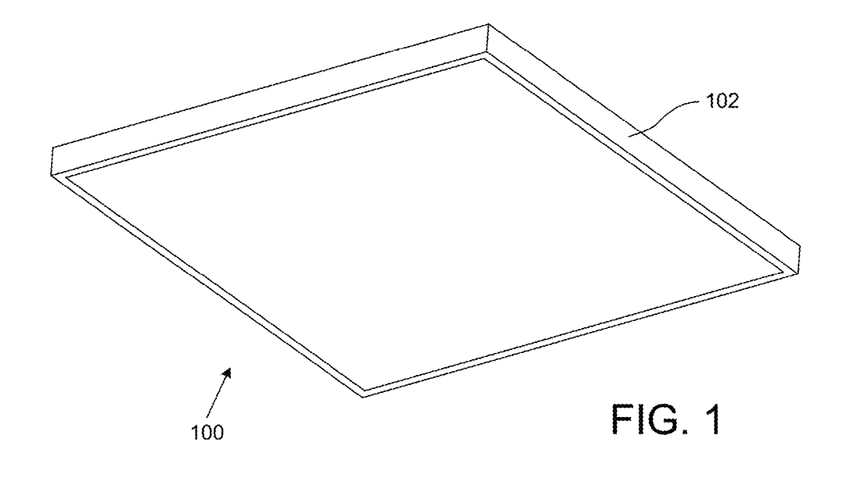
FIG. 1 is a perspective view of a lighting assembly in an exemplary configuration as a ceiling troffer.

With initial reference to FIG. 1, an exemplary embodiment of a lighting assembly is shown at 100. In the illustrated embodiment, the lighting assembly 100 is a square-shaped ceiling troffer. Other shapes for the ceiling troffer are possible, such a rectangular shape. Also, the lighting assembly 100 may take other forms, such as a hanging fixture (e.g., a pendant light), a wall sconce, etc. In the illustrated embodiment, the lighting assembly 100 includes a frame 102 that mechanically retains the components of the lighting assembly 100 that are discussed below.

Figure 2:
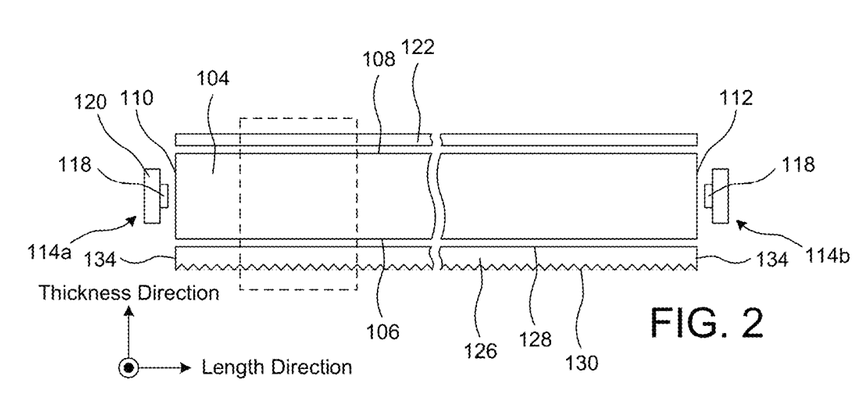
FIG. 2 is a cross-section of the lighting assembly along a longitudinal axis thereof and with a frame removed.

With additional reference to FIG. 2, shown in cross-section are the operative components of the lighting assembly that are retained by the frame 102 (removed in FIG. 2 for purposes of illustration). The lighting assembly 100 includes a light guide 104. The light guide 104 is a solid article of manufacture made from, for example, polycarbonate, poly (methyl-methacrylate) (PMMA), glass, or other appropriate material. The light guide 104 may also be a multi-layer light guide having two or more layers that may differ in refractive index. The light guide 104 includes a first major surface 106 and a second major surface 108 opposite the first major surface 106. The light guide 104 is configured to propagate light by total internal reflection between the first major surface 106 and the second major surface 108. The length and width dimensions of each of the major surfaces 106, 108 are greater, typically ten or more times greater, than the thickness of the light guide 104. The thickness is the dimension of the light guide 104 in a direction orthogonal to the major surfaces 106, 108. The thickness of the light guide 104 may be, for example, about 0.1 millimeters (mm) to about 10 mm.

In one embodiment, the opposed major surfaces 106, 108 each have a length in a length direction and a width in a width direction (unlabeled in FIG. 2, but represented by the dot notation). The length, width and thickness directions are mutually orthogonal to each other and each major surface 106, 108 extends in a respective length-width plane.

At least one edge surface extends between the major surfaces 106, 108 of the light guide 104 in the thickness direction. The total number of edge surfaces depends on the configuration of the light guide 104. In the illustrated embodiment where the light guide is rectangular, the light guide 104 has four edge surfaces, two of which are shown at 110 and 112, respectively. Other light guide shapes result in a corresponding number of side edges. Although not shown, in some embodiments, the light guide 104 may additionally include one or more edge surfaces defined by the perimeter of an orifice extending through the light guide 104 in the thickness direction. Each edge surface defined by the perimeter of an orifice extending through the light guide 104 is referred to as an internal edge surface. Depending on the shape of the light guide 104, each edge surface may be straight or curved, and adjacent edge surfaces may meet at a vertex or join in a curve. Moreover, each edge surface may include one or more straight portions connected to one or more curved portions.

An edge surface having a surface area through which light from a light source 114 is input to the light guide 104 is referred to as a light input edge. In the embodiment shown in FIG. 2, the edge surface 110 is a light input edge and the edge surface 112 also is a light input edge. Light from a first light source 114a is input to the light guide 104 via the light input edge 110 and light from a second light source 114b is input to the light guide 104 via the light input edge 112. Also, in the illustrated embodiment, the first and second light input edges 110, 112 are in parallel planes at opposing edges of the light guide. In another embodiment, the first and second light input edges 110, 112 are in intersecting planes. For instance, light sources 114 may be disposed at adjacent edges of the illustrated rectangular light guide 104. In some embodiments, the light guide 104 has one light input edge or the light guide 104 includes more than two light input edges. Furthermore, the one or more light input edges may be straight and/or curved.

In the illustrated embodiment, the major surfaces 106, 108 are planar. In other embodiments, at least a portion of each of the major surfaces 106, 108 of the light guide 104 is curved in one or more directions. In one example, the intersection of the light input edge 110 and one of the major surfaces 106, 108 defines a first axis, and at least a portion of the light guide 104 curves about an axis orthogonal to the first axis. In another example, at least a portion of the light guide 104 curves about an axis parallel to the first axis. Exemplary shapes of the light guide include a dome, a hollow cylinder, a hollow cone or pyramid, a hollow frustrated cone or pyramid, a bell shape, an hourglass shape, or another suitable shape.

The light sources 114 are positioned adjacent respective light input edges 110, 112. Thus, the light sources 114 are configured to edge light the light guide 104 such that light from the light sources 114 enters the light input edges 110, 112 and propagates along the light guide 104 by total internal reflection at the major surfaces 106, 108.

Each light source 114 includes one or more solid-state light emitters 118. The solid-state light emitters 118 constituting each light source 114 are arranged linearly or in another suitable pattern depending on the shape and length of the light input edge 110, 112 of the light guide 104 to which the light source 114 supplies light.

Exemplary solid-state light emitters 118 include such devices as LEDs, laser diodes, and organic LEDs (OLEDs). In an embodiment where the solid-state light emitters 118 are LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 118 emit light with no operably-effective intensity at wavelengths greater than 500 nanometers (nm) (i.e., the solid-state light emitters 118 emit light at wavelengths that are predominantly less than 500 nm). In some embodiments, the solid-state light emitters 118 constituting a light source 114 all generate light having the same nominal spectrum. In other embodiments, at least some of the solid-state light emitters 118 constituting a light source 114 generate light that differs in spectrum from the light generated by the remaining solid-state light emitters 118 of the light source 114. For example, two different types of solid-state light emitters 118 may be alternately located along the light source 114.

Each solid-state light emitter 118 emits light at a light ray angle distribution relative to an optical axis of the solid-state light emitter 118. The optical axis is defined as an axis extending orthogonally from the center of the light emitting surface of the solid state light emitter 118. The solid-state light emitter 118 may be arranged so that the optical axis is perpendicular to the respective light input edge 110, 112.

The lighting assembly 100 may include one or more additional components. For example, although not specifically shown in detail, in some embodiments of the lighting assembly, the light source 114 includes structural components to retain the solid-state light emitters 118. In the example shown in FIG. 2, each solid-state light emitter 118 is mounted to a printed circuit board (PCB) 120. The light source 114 may additionally include circuitry, power supply, electronics for controlling and driving the solid-state light emitters 118, and/or any other appropriate components.

The lighting assembly 100 may additionally include a housing, such as the frame 102, for retaining the light source 114 and the light guide 104. The housing may retain a heat sink or may itself function as a heat sink. In some embodiments, the lighting assembly 100 includes a mounting mechanism (not shown) to mount the lighting assembly to a retaining structure (e.g., a ceiling, a wall, etc.).

Figure 3:
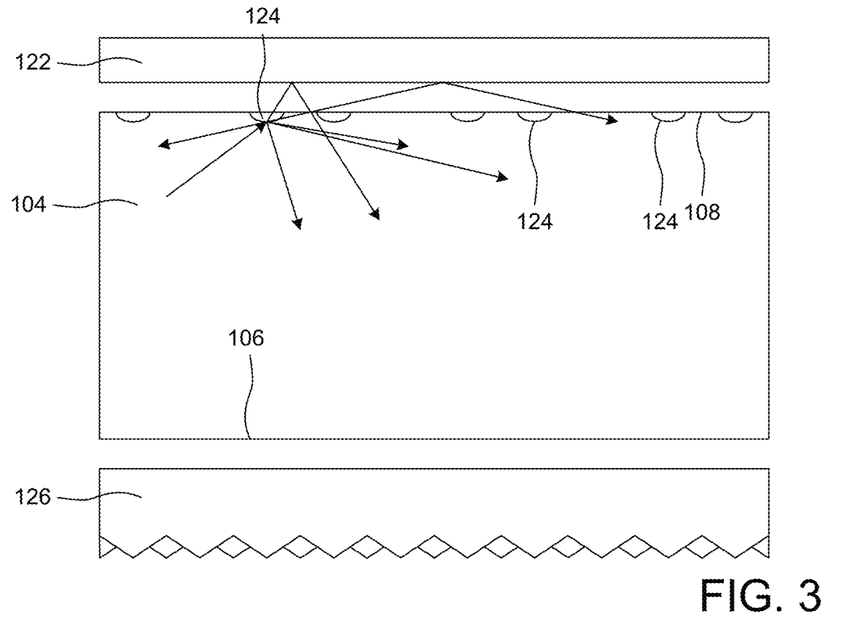
FIG. 3 is an enlarged portion of the cross-section of FIG. 2 showing an exemplary embodiment of disruption of light propagation in the light guide.

With addition reference to FIG. 3, shown an enlargement of a portion of the lighting assembly 100 surrounded by the broken line rectangle in FIG. 2. Noting that the appended figures are intended to be schematic representations, additional detail is visible in FIG. 3 that is not shown in FIG. 2 and various proportions are not necessarily in matching scales.

In embodiments where the lighting assembly 100 is configured to illuminate a space (e.g., a room, hallway, store aisle, etc.), as well as in other lighting situations, the lighting assembly 100 may include a specular or diffuse back reflector 122 adjacent the second major surface 108. In this case, light extracted through the second major surface 108 may be reflected by the reflector 122, re-enter the light guide 104 at the major surface 108, and be output from the light guide 104 through the opposing major surface 106.

The light guide 104 includes light extracting elements 124 in, on, or beneath at least one of the major surfaces 106, 108. Light extracting elements 124 that are in, on, or beneath a major surface will be referred to as being "at" the major surface. In one embodiment, such as that shown in FIG. 3, the light extracting elements 124 are of indistinct shape and/or surface texture and scatter light incident on the light extracting elements 124. FIG. 3 shows interaction of an representative light ray with a light extracting element 124 that has an indistinct shape and that was formed by laser etching. For ease of illustration, the light extracting elements 124 are shown with relatively smooth surfaces in FIG. 3. But a laser-etched light extracting element typically will have irregular surfaces as is understood in the art.

Other light extracting elements 124 that scatter light are possible. Light extracting elements 124 that scatter light are typically features of indistinct shape or indistinct surface texture and include, for example, printed features, inkjet printed features, selectively-deposited features, chemically etched features, laser etched features, phosphor dots, quantum dots, and so forth. Other exemplary light extracting elements 124 include features of well-defined shape (also referred to as micro-optical elements) that predictably reflect or refract the light propagating in the light guide 104. One or more of the surfaces of the micro-optical elements may be modified, such as roughened, to produce a secondary effect on light output.

The micro-optical elements can be any suitable shape. As an example, the micro-optical elements may be configured as v-groove-shaped depressions having an arcuate ridge, hereinafter referred to as "football-shaped" micro-optical elements. A football-shaped micro-optical element resembles the profile of the ball used in American football. Each football-shaped micro-optical element includes a first side surface and a second side surface that come together to form a ridge having ends that intersect the one of the major surfaces at which the micro-optical element is formed. The included angle formed between the first side surface and the second side surface may be any suitable angle, and may be set for extracting light from the light guide at a defined intensity profile and/or light ray angle distribution. As an example, the included angles of the respective football-shaped micro-optical elements may range from 40 degrees to 165 degrees.

Other exemplary embodiments of the light guide may include micro-optical elements having other suitable shapes. In an example, one or more of the micro-optical elements may be configured as a truncated cone having a planar end surface and at least one side surface extending from the major surface to the end surface at an angle relative to the major surface. Other exemplary micro-optical elements are described in U.S. Pat. No. 6,752,505 and, for the sake of brevity, will not be described in detail in this disclosure. The light extracting elements 124 may vary in one or more of size, shape, depth or height, density, orientation, slope angle, included angle, or index of refraction such that a desired light output from the light guide 108 is achieved. In some embodiments, one or more of the light extracting elements 124 are an indentation in the major surface 106, 108. In other embodiments, one or more of the light extracting elements 124 are a protrusion from the major surface 106, 108.

In some embodiments, the light extracting elements 124 are configured to extract light in a defined intensity profile (e.g., a uniform intensity profile) and with a defined light ray angle distribution from one or both of the major surfaces 106, 108. In this disclosure, intensity profile refers to the variation of intensity with regard to position within a light-emitting region (such as the major surface or a light output region of the major surface). The term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface.

In most embodiments, the light extracting elements 124 are small relative to the linear dimensions of the major surfaces 106, 108. The smaller of the length and width of a light extracting element is less than one-tenth of the longer of the length and width of the light guide 104, and the larger of the length and width of the light extracting element is less than one-half of the smaller of the length and width of the light guide. The length and width of the light extracting element are measured in a plane parallel to the major surface 106, 108 of the light guide 104 for flat light guides 104 or along a surface contour for non-flat light guides 104.

Propagating light that is disrupted by the light extracting elements is directed toward the opposing major surface (major surface 106 in the illustrated embodiment) or output from the major surface at which the light extracting elements are located (major surface 108 in the illustrated embodiment). Light directed toward the opposing major surface 106 may exit the light guide through the major surface 106 or continue to propagate by total internal reflection if it has an angle of incidence greater than the critical angle for total internal reflection. In the case where the reflector 122 is present, light incident on the reflector 122 is reflected and may re-enter the light guide 104 through the major surface 108 through which it exited. This light may travel through the light guide 104 and will typically re-exit the light guide 104 through the opposing major surface 106, although some may be continue to propagate by total internal reflection.

The following description will be made in the context of the illustrated lighting assembly 100 in which the vast major of light output from the light guide 104 is intended to be directed away from the first major surface 106 to illuminate a space or surface. To aid in this purpose, the reflector 122 adjacent the second major surface 108 is present. To improve desired light ray angle distribution of the light output through the first major surface 106, a cover element 126 is present adjacent the first major surface 106. There may be other applications where it is desired that light is directed away from both major surfaces 106, 108 to illuminate respective spaces or surfaces. In this case, the reflector 122 may be replaced by a second cover element 126 adjacent the second major surface 108.

Regardless of the physical characteristics of the light extracting element 124 that disrupts total internal reflection of propagating light (e.g., a light extracting element 124 of well-defined shape or a light extracting element of indistinct shape and/or indistinct surface texture) and regardless of path of the light prior to exiting the major surface 106, some light that is output from the light guide 104 and via the major surface 106 may be at high angles (e.g., angles of greater than ±45° measured from normal to the major surface 106). This may result in glare and/or a light ray angle distribution that is larger than desired.

The cover element 126 is configured to redirect high angle light to have a reduced angle of travel in the thickness direction. The cover element 126 includes a first major surface 128 and a second major surface 130 opposed to the first major surface 128. The first major surface 128 of the cover element 128 is juxtaposed with the first major surface 106 of the light guide 104. The first major surface 128 of the cover element 128 is not optically coupled with the first major surface 106 of the light guide 104 to avoid extracting light from the light guide 104 with the cover element 128. In one embodiment, the light guide 104 and the cover element 128 are separated by an air gap. The air gap may be created with spacers or retaining mechanisms for the light guide 104 and the cover element 128, but it is possible to create a sufficient air gap by simply placing the first major surface 128 of the cover element 126 against the first major surface 106 of the light guide 104 provided that the light guide 104 and the cover element 126 have different indices of refraction. The reflector 122 may be separated from the first major surface 106 of the light guide 104 by a similar air gap.

Figure 4:
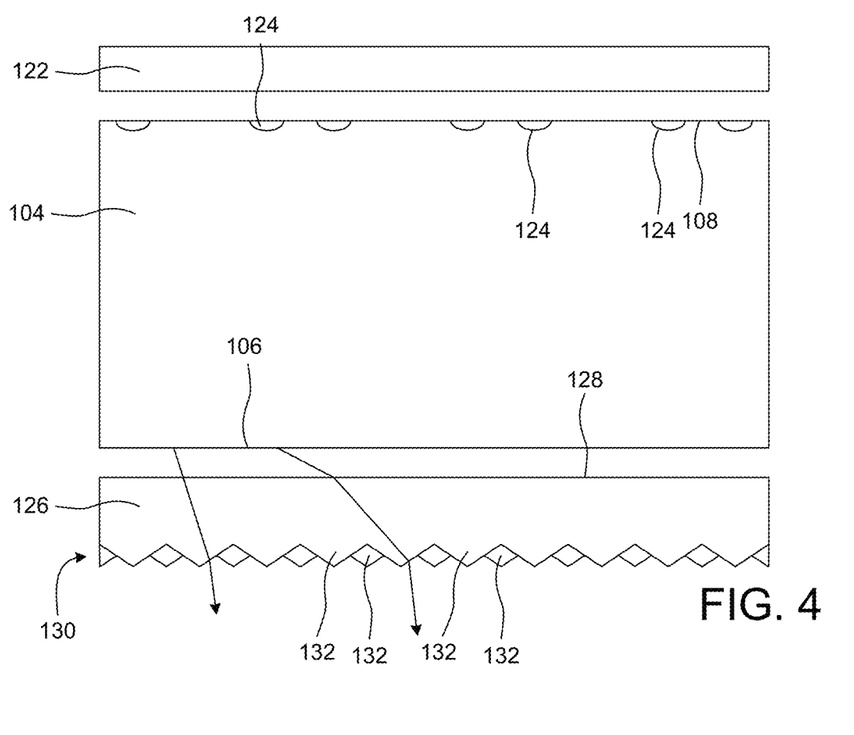
FIG. 4 is another view of the enlarged portion of the cross-section of FIG. 2 showing exemplary light interaction with a cover element of the lighting assembly.

With additional reference to FIG. 4, shown is the enlarged portion of the lighting assembly 100 shown in FIG. 3. FIG. 4, however, schematically depicts light interaction with the cover element 126. More specifically, the light output from the light guide 104 via the first major surface 106 of the light guide 104 enters the cover element 126 via the first major surface 128 of the cover element 126 and propagates toward the second major surface 130 of the cover element 126. The second major surface 130 of the cover element 126 includes optical elements 132. The maximum depth of the optical elements 132 into the cover element 126 in the thickness direction does not reach the first major surface 128 of the cover element 126. In this manner, the first major surface 128 of the cover element 126 may be planar to avoid the creation of contact points with the light guide 104 that may cause undesired light extraction from the light guide 104. Otherwise, the overall thickness of the cover element 104 may be dictated by other considerations, such as material consumption, desire strength, flexibility or rigidity of the cover element 126, or other desired characteristics. Typically, the cover element 126 is thinner than the light guide 104, but this need not be the case.

In the length and width directions, the cover element 126 may be approximately the same size and shape as the light guide 104. As such, edges 134 of the cover element 126 may align with edges 134 of the light guide 104.

Figure 5:
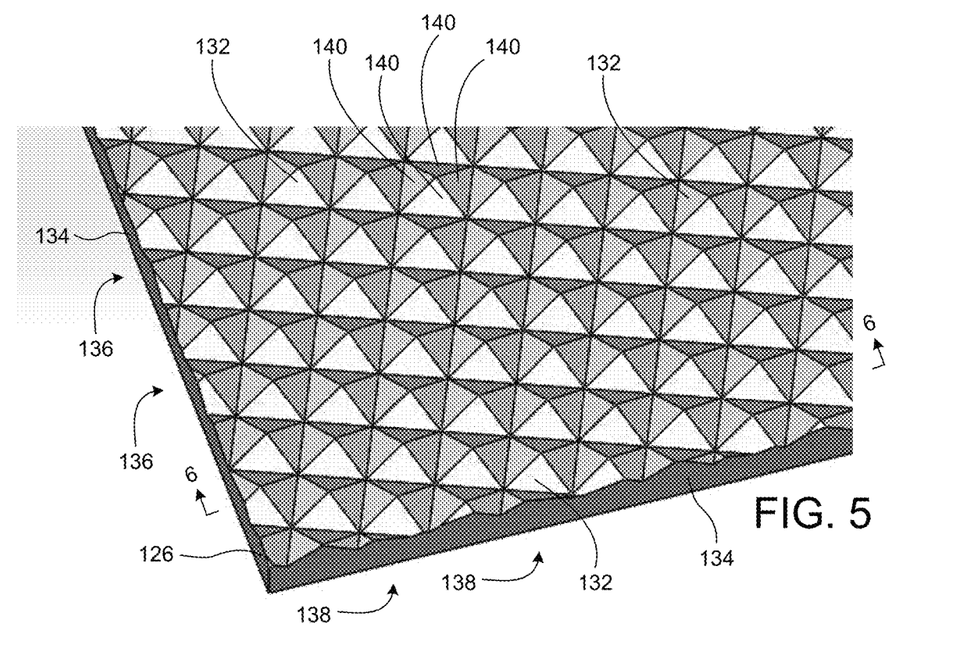
FIG. 5 is a bottom perspective view of a corner portion an exemplary embodiment of the cover element.
Figure 6:
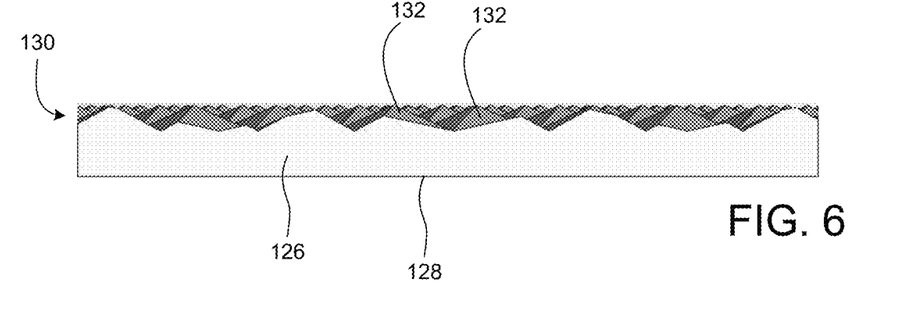
FIG. 6 is a cross-section of the corner portion of the cover element taken approximately along the line 6-6 in FIG. 5.

With additional reference to FIGS. 5 and 6, the optical elements 132 are arranged in a repeating pattern, such as the illustrated arrangement of optical elements 132 located in rows 136 and columns 138. The rows 136 and columns 138 may be arranged to be parallel to the edges 134 of the cover element 126 or, as best illustrated in FIGS. 5 and 6, the rows 136 and columns 138 may be arranged at angles to the edges 134. In either case, the optical elements 132 form an array of optical elements 132 covering the second major surface 130 of the cover element 126.

Each optical element 132 includes plural surfaces 140 that are arranged relative one another. In one embodiment, the surfaces 140 are specular to predictably refract light. But it is possible that one or more surfaces may have an additional characteristic to further modify the light passing through the cover element 126, such as a light directing characteristic, light scattering or diffusing characteristic and/or spectral changing characteristic.

The cover element 126 reduces glare from the lighting assembly 110 and increases ray angle control, thereby making many previously unachievable intensity distributions possible. The cover element 126 reduces glare in two ways. More specifically, additional interfaces (e.g., at the first and second major surfaces 128, 130) lead to additional Fresnel reflections, which preferentially reflect higher angle light to reduce the amount of light exiting the system at high angles. Also, the optical elements 140 redirect light away from the higher angles. The optical elements also may be used to adjust the distribution when higher levels of angular control are desired.

The surfaces 140 of the optical elements 132 are collectively arranged to redirect high angle light incident on any one of the surfaces 140 of the optical elements 132 to have a reduced angle in the thickness direction as the light exits the cover element 126 through the optical element 132. As best illustrated in FIG. 4, the redirection of the light may occur by refraction. The surfaces 140 of the optical elements 132 are collectively arranged to redirect the light in this manner regardless of the direction of the length-width vector component of the light. Therefore, each optical element 132 redirects high angle light incident on any one of the surfaces 140 of the optical element 132 and travelling in a direction with any length-width vector component to have a reduced angle in the thickness direction as the light exits the cover element 126 through the optical element 140. It is noted that the thickness direction is parallel to normal to the first major surface 106 in the illustrated embodiment of planar light guide. Naturally, low angle light (light emitted from the light guide 104 at an angle of less than 45° from normal to the first major surface 106) also may be redirected in a similar manner to have a reduced angle in the thickness direction.

In one embodiment, the optical elements 132 are pyramids at the second major surface 130 of the cover element 126. Other shapes or optical element geometries are possible and/or more than one shape may be used on the cover element 126. Also, the pattern or layout of the optical elements 132 at the second surface 130 of the cover element 126 may be changed. Varying the optical elements 132 and/or the layout of the optical elements 132 may be used to achieve different levels of control and light redirection. Additional changes in light ray angle distribution of light emitted from the lighting assembly 100 may be achieved by changing the light extracting elements 124 and/or by changing the characteristics of the reflector 122.

In the illustrated embodiment, the pyramids may be square pyramids with four planar surfaces 140 and four corresponding base edges. In embodiments where the rows 136 and columns 138 are arranged at angles to the edges 134, the base edges of pyramids are arranged at corresponding angles to the edges 134. In one embodiment, the optical elements 132 are small relative to the linear dimensions of the major surfaces 128, 130. The smaller of the length and width of an optical element 132 is less than one-tenth of the longer of the length and width of the cover element 126, and the larger of the length and width of the optical element 132 is less than one-half of the smaller of the length and width of the light guide. The length and width of the optical elements 132 are measured in a plane parallel to the major surface 130 of the cover element 126. In one embodiment where the lighting assembly is a ceiling troffer (e.g., a 2 foot by 2 foot ceiling troffer or a 2 foot by 4 foot ceiling troffer), the pyramid-shaped optical elements 132 may have base lengths of about 10's of µm to about 10's of mm and a height of about 10's of µm to about 10's of mm.

Figure 7:
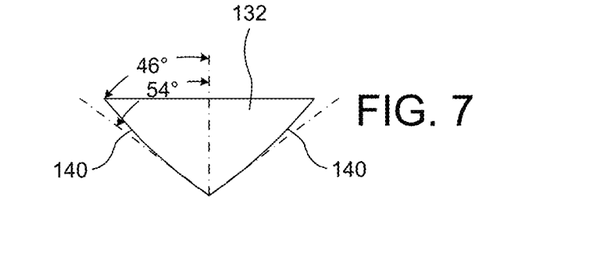
FIG. 7 is a cross-section of an optical element of the cover element in which the optical element has curved surfaces.

In one embodiment, the surfaces 140 of the optical elements 132 may be curved. With additional reference to FIG. 7, illustrated is a cross-section of a pyramid-shaped optical element 132 with curved surfaces 140. The curvature of the surfaces 140 is configured to reduce color-splitting in light output from the lighting assembly 100. The term curvature, when used to refer to the curvature of a surface 140 of an optical element 132, is defined as a change in angle over the surface 140. For example, in the representation of FIG. 7, the angle changes by 8°. In other words, a tangent extending from the surface 140 at the apex of the pyramid is 54° relative to normal to the major surfaces 128, 130 and a tangent extending from the surface at the base edge is 46° relative to normal to the major surfaces 128, 130. Thus, the change in angle over the surface 140 is 8°. Other exemplary angle variations include, but are not limited to 2° and 4°.

By including a relatively small amount of curvature to the surfaces 140 of the optical elements 132, the preservation of output angle to input angle can be eliminated. That is, the angle of high angle light will still be reduced, as described. At the same time, precise control over the output may be retained since the output angle of a specific input angle will vary in a predictable, controllable fashion across the optical element 132 based on the location that the interaction occurs along the curvature of the surface 140 on which the light is incident. As indicated, this curvature is defined as the change in angle over the surface instead of a radius. This allows for a definition of curvature that does not rely on the overall size of the optical element 132.

In one embodiment, the cover element 126 includes light redirecting elements at the first major surface 128 of the cover element 126, such as grooves or other features. The light redirecting elements may further reduce the angle of the high angle light output from the first major surface 106 of the light guide 104.

The cover element 126 may be made from polycarbonate, poly(methyl-methacrylate) (PMMA), glass, or other appropriate material. The cover element 126 may be made by injection molding. In this embodiment, the optical elements 132 are typically defined in a shim or insert used for injection molding components by a process such as diamond machining, laser micromachining, photolithography, or another suitable process. Alternatively, any of the above-mentioned processes may be used to define the optical elements 132 in a master that is used to make the shim or insert. In other embodiments, cover elements 126 without optical elements 132 may be formed by a process such as injection molding or extruding, and the optical elements 132 are subsequently formed by a process such as stamping, embossing, or another suitable process. 3D printing also may be used to manufacture the cover element 126.

Several prophetic examples of the effect on ray angle distribution by the cover element 126 will now be described.

Example 1

Figure 8:
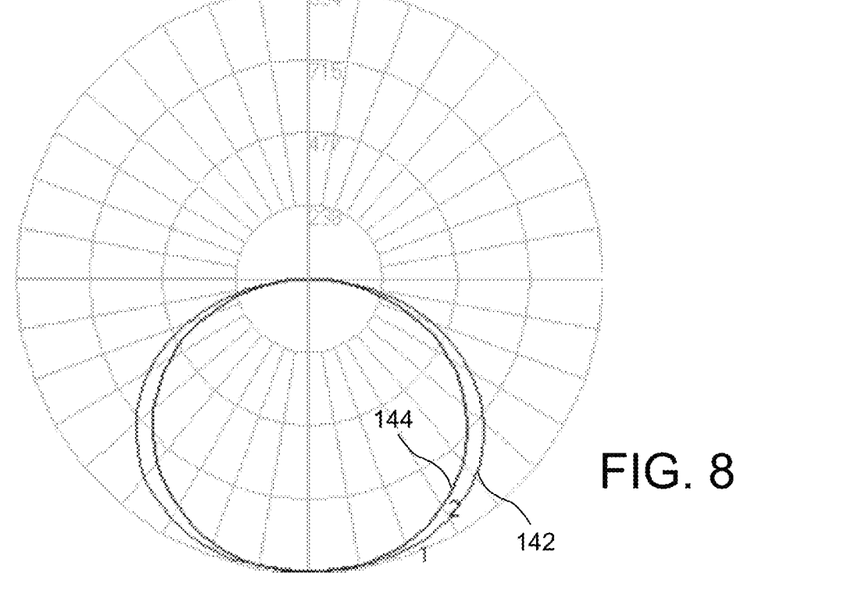
FIG. 8 is a polar plot of light output from a first representative lighting assembly without a cover element.

FIG. 8 shows a polar plot of light output from a first representative lighting assembly without a cover element. In this lighting assembly, the light extracting elements are laser etched elements of indistinct shape and located at the second major surface of the light guide consistent with the embodiment of FIGS. 3 and 4. The reflector is a diffuse back reflector. Curve 142 represents luminous intensity distribution in the 0°-180° plane and curve 144 represents luminous intensity distribution in the 90°-270° plane.

Figure 9:
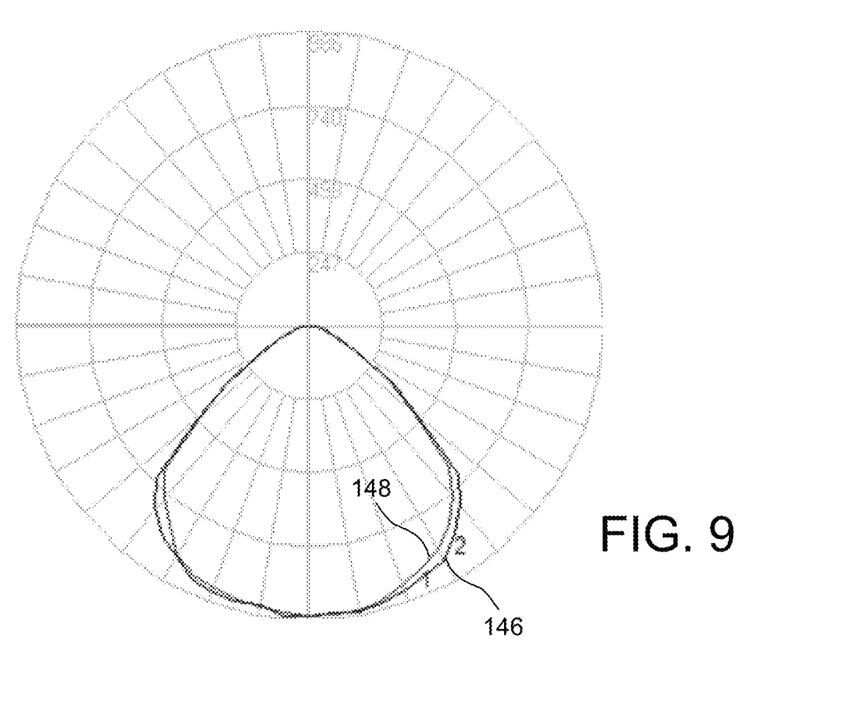
FIG. 9 is a polar plot of light output from the first representative lighting assembly with a cover element.

FIG. 9 shows a polar plot of light output from the first representative lighting assembly but with a cover element that redirects high angle light to have a lower angle of output. Curve 146 represents luminous intensity distribution in the 0°-180° plane and curve 148 represents luminous intensity distribution in the 90°-270° plane. As can be seen, the light output with the cover is more controlled and has a narrower range angle distribution, with less glare, than the same assembly but without a cover.

Example 2

Figure 10:
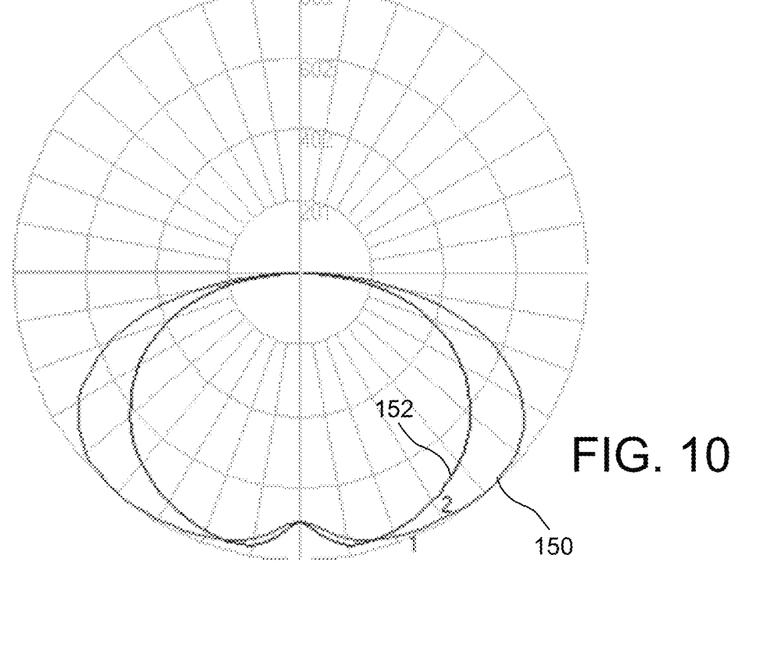
FIG. 10 is a polar plot of light output from a second representative lighting assembly without a cover element.

FIG. 10 shows a polar plot of light output from a second representative lighting assembly without a cover element. In this lighting assembly, the light extracting elements are laser etched elements of indistinct shape and located at the second major surface of the light guide consistent with the embodiment of FIGS. 3 and 4. The reflector is a specular back reflector. Curve 150 represents luminous intensity distribution in the 0°-180° plane and curve 152 represents luminous intensity distribution in the 90°-270° plane.

Figure 11:
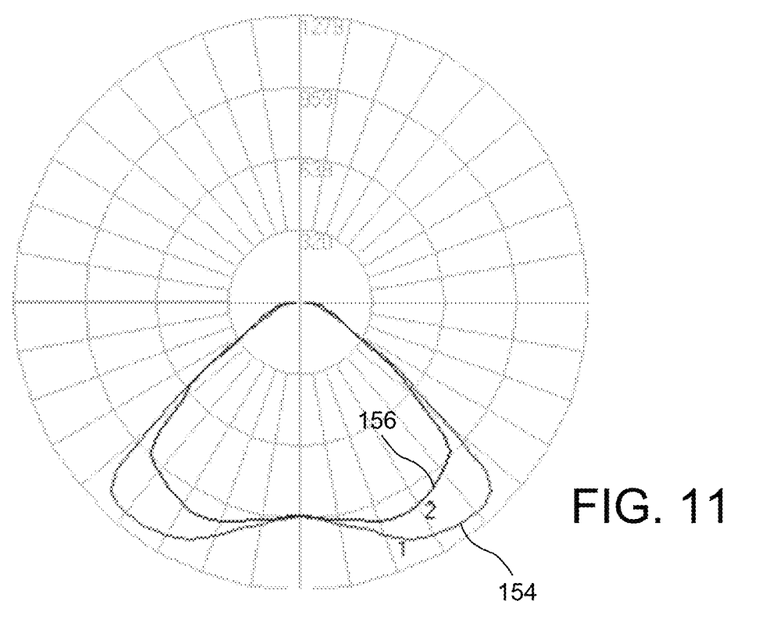
FIG. 11 is a polar plot of light output from the second representative lighting assembly with a cover element.

FIG. 11 shows a polar plot of light output from the first representative lighting assembly but with a cover element that redirects high angle light to have a lower angle of output. Curve 154 represents luminous intensity distribution in the 0°-180° plane and curve 156 represents luminous intensity distribution in the 90°-270° plane. As can be seen, the light output with the cover is more controlled and has a narrower range angle distribution, with less glare, than the same assembly but without a cover.

Example 3

Figure 12:
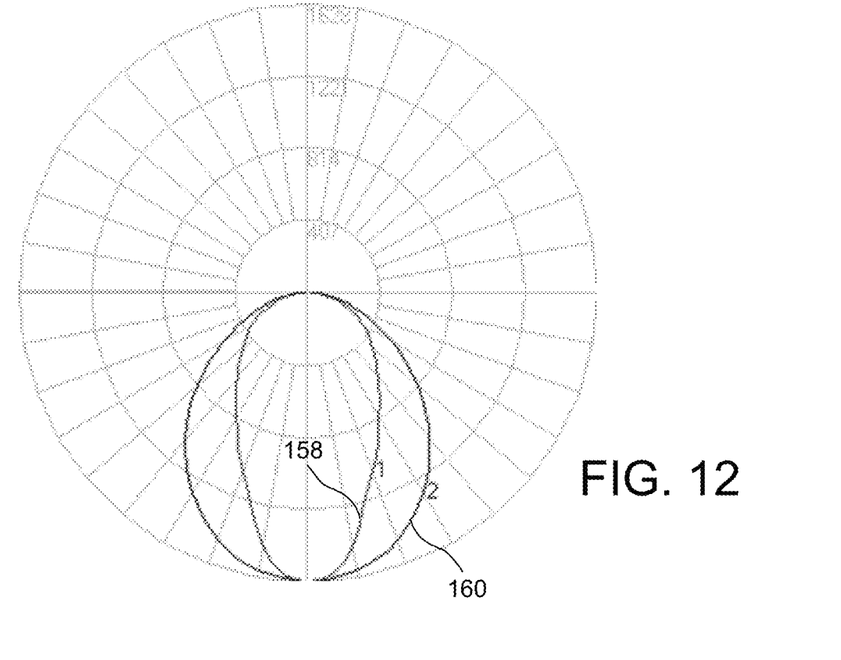
FIG. 12 is a polar plot of light output from a third representative lighting assembly without a cover element.

FIG. 12 shows a polar plot of light output from a third representative lighting assembly without a cover element. In this lighting assembly, the light extracting elements are micro-optics formed as high surface roughness "football-shaped" light extracting elements with a 70° included angle. In this disclosure, the term "high surface roughness" refers to a defined surface roughness suitable for imparting a diffuse component to incident light that is reflected or refracted. The high surface roughness is a defined roughness intentionally imparted to the at least one surface of the micro-optical element. The high surface roughness is an average surface roughness ($R_{a\text{-}high}$) equal or greater than about 0.10 μm as measured in an area of 0.005 mm².

The reflector is a diffuse back reflector. Curve 158 represents luminous intensity distribution in the 0°-180° plane and curve 160 represents luminous intensity distribution in the 90°-270° plane.

Figure 13:
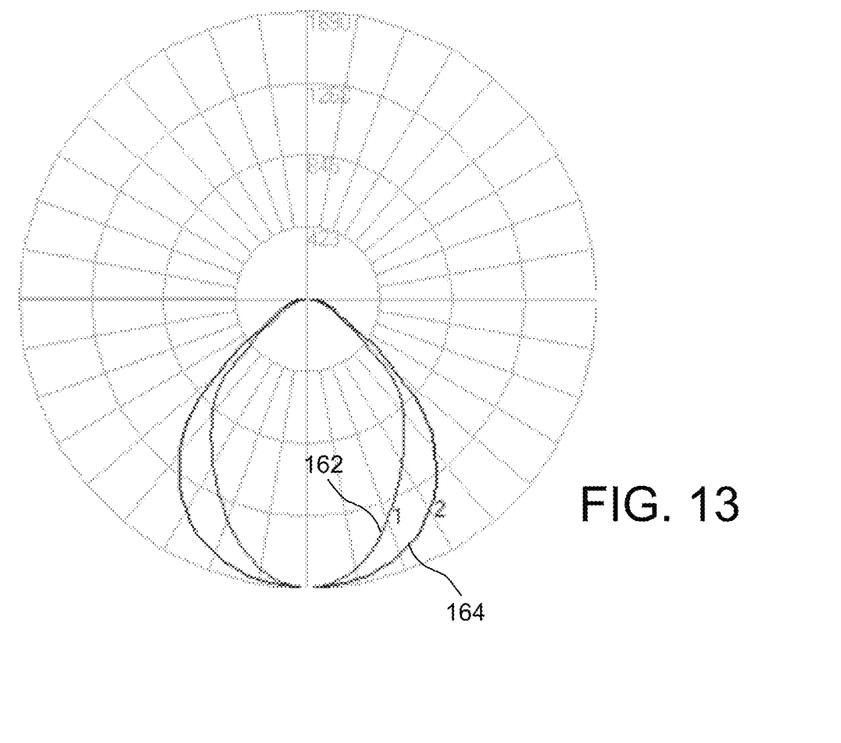
FIG. 13 is a polar plot of light output from the third representative lighting assembly with a cover element.

FIG. 13 shows a polar plot of light output from the third representative lighting assembly but with a cover element that redirects high angle light to have a lower angle of output. Curve 162 represents luminous intensity distribution in the 0°-180° plane and curve 164 represents luminous intensity distribution in the 90°-270° plane. As can be seen, the light output with the cover is more controlled and with less glare than the same assembly but without a cover.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A lighting assembly, comprising:
    a light guide comprising:
        a first major surface and a second major surface opposed to the first major surface, the opposed major surfaces spaced apart in a thickness direction of the light guide and wherein light propagates by total internal reflection between the opposed major surfaces, the opposed major surfaces having a length in a length direction and a width in a width direction, the length, width and thickness directions being mutually orthogonal to each other and each major surface extending in a respective length-width plane;
a light input edge that extends in the thickness direction between the opposed major surfaces and having a surface area through which the light is received into the light guide; and
light extracting elements at at least one of the major surfaces of the light guide, the light extracting elements disrupt the total internal reflection of the propagating light in the light guide to output the light from the light guide via at least the first major surface of the light guide;
a light source positioned relative to the light input edge to input light into the light guide via the light input edge; and
a cover element comprising a first major surface and a second major surface opposed to the first major surface, the first major surface of the cover element juxtaposed with the first major surface of the light guide and the light output from the light guide via the first major surface of the light guide entering the cover element via the first major surface of the cover element and propagating toward the second major surface of the cover element;
wherein the second major surface of the cover element comprises optical elements, the optical elements each comprising plural surfaces arranged relative one another so that the optical element redirects light incident on any one of the surfaces of the optical element and travelling in a direction with any length-width vector component to have a reduced angle in the thickness direction as the light exits the cover element through the optical element, wherein the surfaces of the optical elements are curved, curvature of the surfaces being a change in angle over the surface in the thickness direction, and wherein:
the optical elements extend from a base at the second major surface of the cover element to an apex, and for each of the plural surfaces, a tangent extending from the surface at the apex relative to normal to the major surface and a tangent extending from the surface at the base edge relative to normal to the major surface differ by 2°-8°.

2. The lighting assembly of claim 1, wherein the light source is a solid state light source.

3. The lighting assembly of claim 1, wherein the light extracting elements are at the second major surface of the light guide.

4. The lighting assembly of claim 1, wherein the light extracting elements are light scattering elements.

5. The lighting assembly of claim 1, wherein the light extracting elements have well-defined shapes to predictably reflect or refract light.

6. The lighting assembly of claim 1, further comprising a back-reflector juxtaposed with the second major surface of the light guide, the back-reflector reflecting light extracted through the second major surface of the light guide back through the light guide and out the first major surface of the light guide, the reflected light including light output from the first major surface of the light guide that has a high angle relative to the first major surface of the light guide.

7. The lighting assembly of claim 1, wherein the light input edge is a first light input edge and the light source is a first light source, and wherein the light guide further comprises a second light input edge and the lighting assembly further includes a second light source positioned relative to the second light input edge to input light into the light guide via the second light input edge.

8. The lighting assembly of claim 7, wherein the first and second light input edges are in intersecting planes.

9. The lighting assembly of claim 7, wherein the first and second light input edges are at opposing edges of the light guide.

10. The lighting assembly of claim 1, wherein the optical elements are pyramids at the second major surface of the cover element.

11. The lighting assembly of claim 10, wherein the optical elements are square pyramids.

12. The lighting assembly of claim 1, wherein the cover element further comprises light redirecting elements at the first major surface of the cover element, the light redirecting elements further reducing the angle of the light output from the first major surface of the light guide.

13. A cover element for a light guide-based lighting assembly, comprising:
a first major surface through which light output by the light guide enters the cover element; and
a second major surface opposed to the first major surface and comprising optical elements, the light propagating toward the second major surface and wherein the optical elements each comprise plural surfaces arranged relative one another so that the optical element redirects light incident on any one of the surfaces of the optical element and travelling in a direction with any vector component orthogonal to the normal to have a reduced angle in the normal direction as the light exits the cover element through the optical element, wherein the surfaces of the optical elements are curved, curvature of the surfaces being a change in angle over the surface in the normal direction, and wherein:
the optical elements extend from a base at the second major surface of the cover element to an apex, and for each of the plural surfaces, a tangent extending from the surface at the apex relative to normal to the major surface and a tangent extending from the surface at the base edge relative to normal to the major surface differ by 2°-8°.

14. The cover element of claim 13, wherein the optical elements are pyramids at the second major surface of the cover element.

15. The cover element of claim 14, wherein the optical elements are square pyramids.

16. The cover element of claim 13, wherein the cover element further comprises light redirecting elements at the first major surface of the cover element, the light redirecting elements further reducing the angle of the light output from the light guide.

17. A lighting assembly, comprising:
a light guide comprising:
a first major surface and a second major surface opposed to the first major surface, the opposed major surfaces spaced apart in a thickness direction of the light guide and wherein light propagates by total internal reflection between the opposed major surfaces, the opposed major surfaces having a length in a length direction and a width in a width direction, the length, width and thickness directions being mutually orthogonal to each other and each major surface extending in a respective length-width plane;

a light input edge that extends in the thickness direction between the opposed major surfaces and having a surface area through which the light is received into the light guide; and light extracting elements at at least one of the major surfaces of the light guide, the light extracting elements disrupt the total internal reflection of the propagating light in the light guide to output the light from the light guide via at least the first major surface of the light guide;

a light source positioned relative to the light input edge to input light into the light guide via the light input edge; and a cover element comprising a first major surface and a second major surface opposed to the first major surface, the first major surface of the cover element juxtaposed with the first major surface of the light guide and the light output from the light guide via the first major surface of the light guide entering the cover element via the first major surface of the cover element and propagating toward the second major surface of the cover element;

wherein the second major surface of the cover element comprises optical elements, the optical elements each comprising plural surfaces arranged relative one another so that the optical element redirects light incident on any one of the surfaces of the optical element and travelling in a direction with any length-width vector component to have a reduced angle in the thickness direction as the light exits the cover element through the optical element, wherein the surfaces of the optical elements are curved, curvature of the surfaces being a change in angle over the surface in the thickness direction, and wherein the optical elements are pyramids extending from a base at the second major surface of the cover element to an apex.

18. The lighting assembly of claim 17, wherein the cover element further comprises light redirecting elements at the first major surface of the cover element, the light redirecting elements further reducing the angle of the light output from the first major surface of the light guide.

19. A cover element for a light guide-based lighting assembly, comprising:

a first major surface through which light output by the light guide enters the cover element; and a second major surface opposed to the first major surface and comprising optical elements, the light propagating toward the second major surface and wherein the optical elements each comprise plural surfaces arranged relative one another so that the optical element redirects light incident on any one of the surfaces of the optical element and travelling in a direction with any vector component orthogonal to the normal to have a reduced angle in the normal direction as the light exits the cover element through the optical element, wherein the surfaces of the optical elements are curved, curvature of the surfaces being a change in angle over the surface in the normal direction, and wherein the optical elements are pyramids extending from a base at the second major surface of the cover element to an apex.

20. The cover element of claim 19, wherein the cover element further comprises light redirecting elements at the first major surface of the cover element, the light redirecting elements further reducing the angle of the light output from the light guide.

* * * * *